April 30, 1968

R. E. DIETZ ETAL
3,381,240
DIVALENT METAL DOPED FLUORIDES AS OPTICAL MASER MATERIAL

Filed Dec. 20, 1963

INVENTORS: R.E. DIETZ
H.J. GUGGENHEIM
L.F. JOHNSON

BY:

ATTORNEY 3,381,240
DIVALENT METAL DOPED FLUORIDES AS
OPTICAL MASER MATERIAL
Robert E. Dietz, Morristown, Howard J. Guggenheim, Dunellen, and Leo F. Johnson, Bedminster, N.J., assignors to Bell Telephone Laboratories, Incorporated, New York, N.Y., a corporation of New York
Continuation-in-part of application Ser. No. 302,108, Aug. 14, 1963. This application Dec. 20, 1963, Ser. No. 333,266
4 Claims. (Cl. 331—94.5)

ABSTRACT OF THE DISCLOSURE

Phonon terminated laser action occurs in materials of the group consisting of magnesium fluoride and zinc fluoride as host in which a portion of the host ions have been replaced by divalent metal ions from the group consisting of cobalt and nickel.

Figure 1:
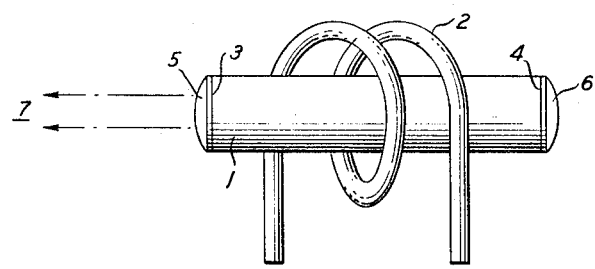

This invention relates to optical masers employing phonon-terminated emission lines of appropriate active media. Optical masers of this type may be employed as tunable oscillators or as broadband optical amplifiers. The materials of the invention include a fluoride host lattice and additionally contain transition metal ions in the 2+ valence state.

This application is a continuation-in-part of my copending application, Ser. No. 302,108, filed Aug. 14, 1963, now abandoned.

Recently, considerable attention has been focused on a new class of solid state maser devices which are capable of generating or amplifying coherent electromagnetic wave energy in the optical frequency range. Devices of this type, which are described, for example in United States Patent No. 2,929,922 to Schawlow and Townes, are considered to be operable over the spectral range from far infrared to ultraviolet, an equivalent bandwidth of about $10^{15}$ cycles. Such a bandwidth is capable of providing a great number of new communications channels, thereby multiplying the number of available channels which has heretofore been limited by the characteristics of the heavily used lower frequency portions of the spectrum. Additionally, such devices have been suggested for use in a variety of industrial applications, such as microwelding.

Typically, a maser of the type known in the art employs an active material characterized by a plurality of distinct electronic energy levels, the separation of these levels corresponding to frequencies within the desired operating frequency ranges. More particularly, the separation between two of the electronic energy levels $E_1$ and $E_2$ corresponds to quantized wave energy having a frequency $\nu_{12}$ given by Bohr's equation $$\nu_{12} = \frac{E_2 - E_1}{h}$$

where $h$ is Planck's constant.

In accordance with the maser principle, wave energy in an appropriate frequency range is applied to an ensemble of paramagnetic ions, thereby "pumping" electrons from a lower energy level to a higher level. The excited electrons tend to remain in the upper level for a short time before decaying or relaxing to the lower level. The downward transition is normally accompanied by the radiation of photons or quantized electromagnetic wave energy of the frequency corresponding to separation between the electronic energy levels concerned. During maser operation sufficient pump power is supplied to the active medium to produce, at least intermittently, a non-equilibrium population distribution of electrons between the pair of the energy levels. More particularly, the population of the upper level is increased with respect to that of the lower level. When the population of the upper level exceeds that of the lower level, a population inversion or negative temperature is considered to obtain. Operation of the maser is dependent upon the fact that a small signal at the proper frequency acts to stimulate the downward transition of the excited electrons from the upper energy level to the lower one, and that the resultant stimulated emission is coherent and in phase with the stimulating signal.

Among the more promising forms of maser are those which utilize an active medium characterized by first, second and third succesively higher electron energy levels. Typically, in optical maser materials the upper level is relatively broad, and in some cases is best described as a band. Continuous wave operation of such three-level devices may be achieved, for example, by pumping electrons from the first to the third level from which they relax spontaneously by nonradiative processes, to the second level, thereby producing the desired population inversion between the second and first levels. Advantageously, in masers of this type, the relaxation time between the third and second levels is shorter than that between the second and first levels so that the population of the second level may be continuously maintained during operation of the device. Additionally, as the magnitude of the negative temperature attained depends on the relative populations of the first and second levels, the energy level system of preferred materials also include mechanisms which continuously depopulate the terminal state of the optical transition. Thus, the population inversion is maintained at a relatively high value and maser action is facilitated.

In a particular class of materials considered especially advantageous for use in optical masers, the electronic energy system has at least four distinct levels. The lower or first level may be the ground state of the system. The second and third levels are optically connected and define the maser transition. Population inversion between these levels is achieved by pumping electrons from the ground state to the fourth level from which they relax to the third level. Following the stimulated transition from the third to the second level, electrons rapidly decay to the ground state so that the population of the terminal state of the maser transition is kept small and hence the magnitude of the population inversion between the second and third levels is kept large.

In some materials of this class, for example in neodymium calcium tungstate, the lower energy state of the maser transition is normally unpopulated. Thus, a negative temperature results as soon as electrons are pumped to the upper state and optical maser oscillation can be achieved when the gain exceeds the losses in the system.

Among the more promising active maser materials are those which comprise a host crystal containing paramagnetic ions from which the stimulated emission occurs. The host crystal must be of a material capable of accepting the paramagnetic ions in such a way that they are able, upon excitation, to fluoresce with good over-all quantum efficiency with as much as possible of the emitted photon energy concentrated in a single narrow spectral line.

More particularly, it has priorly been considered that the host must accept the ions in such a way as to minimize coupling between them and the crystal lattice at the maser frequency, while simultaneously permitting relaxation from the pump band to the upper energy level of the signal pair. Additionally, the host crystal should be of good optical quality. That is to say, it must be relatively free of optical scattering centers and hence transparent to the light waves at the operating frequency of the maser. Furthermore, the host should have a low coefficient of absorption at the pump frequency to minimize heating of the maser medium and to promote more efficient utilization of the pump power. Chemical and physical stability are further desiderata. It is also preferred that the host be of a mechanically workable material, capable of being accurately shaped and highly polished.

One combination of paramagnetic ions with a host lattice meeting the above-mentioned conditions is ruby, which continues to be widely used as an optical maser medium and is, in fact, one of the relatively small number of solid materials which have been operated successfully. Ruby has usable emission lines at 0.6943 micron and 0.6921 micron. In addition, ruby having a high concentration of chromium ions is characterized by sharp satellite lines at 0.7009 micron and 0.7041 micron. Another successful material, operable at liquid hydrogen temperatures, comprises a calcium fluoride host lattice containing samarium ions. Emission from the samarium ions is at 0.7082 micron. A more recently discovered optical maser medium, disclosed in copending application Ser. No. 139,266, filed Sept. 19, 1961, by Johnson and Nassau and assigned to the assignee hereof, is calcium tungstate containing trivalent neodymium ions. Additional newly discovered materials are disclosed in copending applications Ser. Nos. 153,603, 153,604, 153,-605, 153,606, and 153,607 all filed on Nov. 20, 1961, and assigned to the assignee hereof. These include praseodynium in calcium tungstate operating at about 1.047 microns, thulium in calcium tungstate operating at about 1.91 microns, holmium in calcium tungstate operating at about 2.05 microns, and neodymium in calcium fluoride operating at about 1.05 microns.

Inasmuch as the choice of active medium for an optical maser device governs the frequency of the usable emission lines, it is desirable to provide a variety of optical maser materials in order to make possible the generation and amplification of coherent light beams over the wider range of the optical frequency spectrum. Prior to this invention, each optical maser material was ordinarily capable of operating at a single discrete frequency or, under certain conditions, at a plurality of discrete frequencies. Such materials have, at most, a very limited capability of being tuned or varied over the optical spectrum, and they are not suitable for use in broadband optical amplifiers.

It is also characteristic of a number of prior art optical maser media that a portion of the radiation emitted at the maser frequency may be reabsorbed by the atoms or molecules thereof before escaping from the medium itself. In ruby, for example, optical maser action occurs between excited states and the ground state of chromium ions. Unless ruby is pumped with sufficient power to reduce the population of the ground state by at least fifty percent there is a finite probability that a photon emitted upon the stimulated transition of one electron from the excited state to the ground state will be reabsorbed by another chromium ion in the ground state. Such reabsorption is, of course, a loss in the system. As optical maser action does not occur unless the gain due to stimulated emission exceeds the total losses of the system, ruby has a relatively high pump threshold. Materials in which such reabsorption does not occur, all other factors being equal, will have lower thresholds than does ruby. Furthermore, in many materials in which the lower level of the maser transition is not a ground state there exists a substantial electron population in such level at temperatures at which it is desired to operate an optical maser. It will be apparent that a negative temperature is not produced in such a material until the population of the upper state is increased beyond that of the lower one. Such materials will, in general, have high thresholds.

An object of the invention is the generation and amplification of coherent radiation in the optical frequency spectrum.

A feature of the invention is an optical maser having an active medium consisting of divalent paramagnetic ions in a divalent host lattice.

In accordance with the invention, it has been discovered that divalent metal fluoride compositions of matter provide favorable crystalline host lattices for paramagnetic ions not heretofore considered useful as optical maser media. For example, one host lattice of the invention comprises magnesium fluoride which has a noncubic crystalline lattice of the rutile type. Zinc fluoride also has advantageous properties as a host lattice for the ions used in the invention. Paramagnetic ions exhibiting favorable characteristics in such lattices include the divalent ions of the transition metals such as nickel and cobalt.

Priorly known solid state optical maser media have included trivalent rare earth ions in host lattices of divalent metal tungstates and fluorides or divalent metal molybdates, among others. As the trivalent rare earth ions enter such host lattices in place of the divalent metal ions, some form of charge compensation is required. This may take the form, for example, of vacancies at other sites within the lattice, or of the inclusion of interstitial ions of other elements. In general, it may be said that charge compensation causes perturbations in the crystalline fields acting on the fluorescent ions. As a result, the fluorescent spectra are complicated by emission at many different wavelengths not normally present in the spectra of ions in a more uniform lattice environment.

The use of a divalent host lattice for divalent fluorescent ions results in a simpler emission spectrum with a possibility of greater intensity in particular lines and increased efficiency in the use of pump energy. Furthermore, unlike the rare earth ions used in many priorly known optical maser media, the valence shells of transition metal ions are not shielded from the crystalline fields by a filled shell of orbital electrons. The active ions in the materials of the invention are therefore more likely to interact directly with the host lattice. In fact, they are strongly coupled to the lattice at the frequency corresponding to the transition associated with the maser action. In particular, we have found that optical maser action occurs in certain materials on emission lines produced by the stimulated transfer of electrons from excited states to the ground state of transition metal ions accompanied by the simultaneous transfer of a phonon or quantum of vibrational energy to the crystalline host lattice. Thus the total amount of energy emitted by the electronic transition is divided between a photon and a phonon. The wavelength of the stimulated optical emission is, consequently, longer than that normally associated with the transition. More specifically, it no longer corresponds to the energy separation of an excited state and the ground state and so is not subject to reabsorption in the active medium. Elimination of this form of energy loss results in a lower threshold for the desired optical maser action.

The fluorescent spectra of the materials of the invention are characterized by strong sharp "no-phonon" or "pure electronic" emission lines such as those employed in many prior art optical masers. However, their spectra also include broadband vibrational structure adjacent to the no-phonon lines. The vibrational structure results from electronic transitions which are accompanied by the simultaneous emission (or possibly at high temperatures, absorption) of one or more phonons to the crystalline host lattice. Optical masers employing such materials may operate at any wavelength within the combined phonon-no-phonon emission structure at which the gain exceeds a threshold level.

A particular wavelength within the broadband emission structure may be selected by any of many known techniques of optical frequency selection. For example, in an oscillator the reflectors defining the ends of an optical cavity may be designed to have a peak reflectivity at the desired wavelength. Dispersive elements, such as prisms, may be included within the optical cavity. Typically, such elements cause all light waves of wavelengths other than the desired one to leave the cavity after, at most, a few traversals of the active medium. On the other hand, the rays of the desired wavelength will be reflected back and forth many times to be intensified by prolonged interaction with the medium. An amplifier employing an active medium as disclosed herein, on the other hand, is capable of amplifying signals over a broadband of the optical spectrum. Many other possibilities will also be apparent to those skilled in this art.

An optical maser following the principles of the invention is shown in FIG. 1. There is depicted a rod-shaped crystal 1 of a divalent fluoride host lattice having an appropriate concentration of divalent paramagnetic ions as disclosed herein. Pump energy is supplied by a helical lamp 2 encompassing rod 1 and connected to an energy source not shown. Ends 3 and 4 of rod 1 are ground and polished in the form of confocal spherical surfaces. Reflective layers 5 and 6 are deposited on ends 3 and 4, thereby forming an optical cavity resonator of the type described in United States Patent No. 3,055,257, issued Sept. 25, 1962. Advantageously, layer 6 is substantially totally reflecting while layer 5 includes at least a portion which is only partially reflecting to permit the escape of coherent radiation 7 having a wavelength in the optical range. If desired, rod 1 during operation may be maintained in a bath of a liquified gas, such as nitrogen, to maintain a very low temperature. Cooling the crystal tends to reduce the population of energy levels above the ground state. More particularly, the population of the lower level of the maser transition may be reduced if it lies above the ground state, thereby enhancing the negative temperature condition.

The lamp 2 is advantageously of a type which produces intense radiation over a broad band extending from about 0.3 micron to longer wavelengths. Mercury or xenon lamps are considered useful to pump the materials of the invention, which are characterized by a plurality of sharp absorption lines in the specified spectral range. Other types of lamps may, of course, be employed provided they emit sufficient energy at wavelengths corresponding to one or more useful absorption lines of the material. In some cases it is desirable to filter out pump light of wavelengths shorter than about 0.3 micron. Electrons in the active medium, for example in nickel, are excited to upper energy levels by the pump power and relax through nonradiative processes to an intermediate level corresponding to one of the $^3T_2$ levels of the nickel ions. This level corresponds to the metastable level of the above-mentioned exemplary three-level system.

Figure 2:
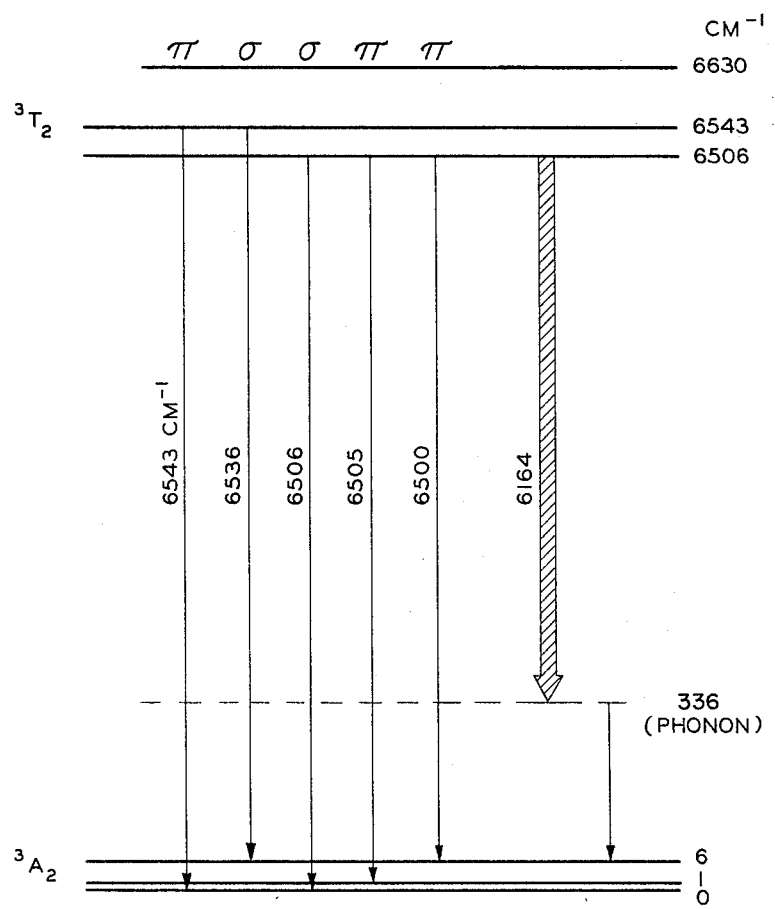

The operation of nickel as the active ion in host lattices of the invention can be better understood by referring to the diagram in FIG. 2 wherein the vertical scale represents energy measured in wave numbers. Pumping radiation from the lamp 2 excites electrons, primarily by various indirect processes, to the first excited state $^3T_2$. Although the sublevels of the $^3A_2$ ground state are closely spaced and have relatively large populations at room temperature, the populations of the upper states of the triplet may be reduced somewhat by cooling the crystal to very low temperatures. A population inversion between one of the $^3T_2$ and the ground state $^3A_2$ levels may therefore be readily produced, and optical maser action may be obtained on the normal electronic transition between these levels. However, the population inversion or negative temperature state required for the desired optical maser action would be more easily achieved if there existed an unpopulated energy state above the ground state at the level indicated, for example by the dashed horizontal line in FIG. 2. Although no such electronic energy level actually exists in materials of the invention, optical maser action has been observed at wavelengths corresponding to the separation between an excited state and the "virtual" energy state represented by the dashed line. At low temperatures (20° K.) five emission lines from 6500 cm.$^{-1}$ to 6543 cm.$^{-1}$ are seen in the fluorescent spectrum of the material. Three closely spaced lines at 6500 cm.$^{-1}$ which are intense and narrow represent electronic transitions from the lowest $^3T_2$ level to the three components of the $^3A_2$ ground state at 0, 1 and 6 cm.$^{-1}$. At slightly higher energy (6536 cm.$^{-1}$ and 6543 cm.$^{-1}$) there are two components of a weak electronic transition to the ground state. These originate from a $^3T_2$ level 37 cm.$^{-1}$ above the initial state for the strong triplet. The polarization of these transitions are also indicated in FIG. 2. $\pi$ lines have their electric vectors parallel to the C axis of the crystal while $\sigma$ lines have their electric vectors perpendicular to the C axis. At room temperature, emission consists of a broad band centered at 6100 cm.$^{-1}$ extending from 5000 to 7500 cm.$^{-1}$.

Optical maser action has been observed in $Ni^{2+}$:$MgF_2$. At 20° K. optical maser emission appears in a line centered at 6164 cm.$^{-1}$ with a width of about 6 cm.$^{-1}$. At 77° K. the line shifts to lower energies by about 4 cm.$^{-1}$ and the width is about 4 cm.$^{-1}$. The threshold at 77° K. is about twelve percent higher than at 20° K.

The emission line on which optical maser action occurs results from a transition between electronic states of $Ni^{2+}$ which is accompanied by a simultaneous vibrational excitation of the $MgF_2$ lattice by transfer of a phonon. It is believed that the electronic transition originates from the lowest $^3T_2$ component. The phonon energy is thus 336 cm.$^{-1}$.

It can be seen from FIG. 2 that there is no electronic transition corresponding to the energy of the photons produced by stimulated emission. The excited electrons which are stimulated to give up their energy make the downward transition to the $^3A_2$ ground state. However, because a part of the energy is given up in the form of a phonon to the crystal lattice, the emitted photon has an energy different from that corresponding to the separation between the excited state and the ground state. Thus the radiation is at a wavelength which is not subject to reabsorption by electrons populating the terminal state. Elimination of this form of loss within the optical maser results in a lower oscillation threshold than would otherwise be obtained.

If the stimulated emission resulted from a pure electronic transition from the $^3T_2$ state, the terminal state would be at the level indicated by the dashed line in FIG. 2. This level has been designated a "virtual" state because no significant number of electrons actually exist in it. So far as the stimulated emission is concerned, however, the virtual state is actually the terminal state of the maser transition. Because it is never populated, a population inversion results as soon as electrons are pumped to the $^3T_2$ levels. The system therefore functions as a "four-level" optical maser.

Optical maser action has also been observed in $MgF_2$ host lattices containing cobalt ions in the 2+ valence state and in $ZnF_2$ lattices containing cobalt 2+. Such action will also occur in $ZnF_2$ host lattices containing $Ni^{2+}$ ions. The ground state of cobalt is split into six sublevels which are relatively widely spaced. Hence at low temperatures the upper levels of the cobalt ground state have relatively small populations and negative temperature or population inversion can be produced between an excited state and these sublevels. Optical maser action can occur on the electronic transitions as well as on the transitions which involve the transfer of a phonon to the crystal lattice. Since the electronic and the phonon lines are at distinct wavelengths, optical maser action on one or the other can be selected by the use of reflectors having peak reflectivities at the desired line.

Other materials in which conditions are favorable for optical maser action of the type described herein are: $KMgF_3$ or $NaMgF_3$ containing either $Co^{2+}$ or $Ni^{2+}$ ions; $KZnF_3$ or $NaZnF_3$ containing either $Co^{2+}$ or $Ni^{2+}$ ions; and the compounds $NiF_2$, $KNiF_3$, $NaNiF_3$, $CoF_2$, $KCoF_3$ and $NaCoF_3$. The electronic transitions of Ni and Co in the above-named compounds are relatively strong. Furthermore, the terminal state of the transitions are above the ground state. These materials therefore will also operate as four-level masers.

Maser action may be achieved over a broad range of paramagnetic ion concentrations. Although in principle there is no lower limit on the impurity concentration which may be employed in the crystal 1, yet a practical limit of about 0.01 percent is imposed by the necessity of having sufficient unpaired electrons available to produce a reasonable output. The preferred concentration of $Ni^{2+}$ ions in the fluoride host crystal is deemed to be about 10 percent. However, useful concentrations can extend considerably higher than 10 percent, for example 30 percent and more.

Crystals in accordance with the invention may be grown by a modification of the Bridgman method. According to this technique the material to be crystallized is melted in a crucible placed in a high temperature region of a furnace characterized by an appropriate temperature gradient over the usable volume. The crucible is then moved at a controlled rate from the high temperature to a low temperature region. The fluoride materials of the invention are advantageously made by carrying out this process in an atmosphere of dry hydrogen fluoride. Magnesium fluoride crystals containing nickel were prepared by thoroughly mixing $NiF_2$ powder with $MgF_2$ powder in the proportions desired. The mixture was then placed in a platinum crucible which was sealed by welding on a top provided with tubulations for the circulation of HF gas. The crucible was then placed in a furnace and heated to about 1300° C. to melt its contents. This temperature was maintained for about twelve hours, with dry HF being circulated constantly. The crucible was then moved to the cooler zone of the oven (about 1100° C.) where the contents cooled to just below their melting point. Nucleation was aided by a conical point on the bottom of the crucible. After remaining at this temperature for 24–48 hours, the crystals were then cooled to room temperature at a rate of about 25° per hour. Modifications of the crystal growing process are of course possible. A more detailed description of the technique is to be found in an article by Guggenheim in the Journal of Applied Physics, volume 34, number 8, page 2482.

Although the invention has been described with reference to a specific embodiment, this is to be construed by way of illustration and does not limit the scope of the invention. For example, the material may be used in optical cavity resonators other than the confocal type. The parallel plate resonator, as well as others, may also be employed. The materials may also be used in optical maser amplifiers which do not employ a resonator. Other variations are also possible within the spirit of the invention.

What is claimed is:

1. An optical maser material characterized by having a pair of optically connected energy levels and a virtual level intermediate the levels of said pair, the wavelength of the photon emission of said material corresponding to the separation between the upper level of said pair and said virtual level, the photon emission being accompanied by phonon emission at an energy corresponding to the separation between said virtual level and the lower level of said pair, said material consisting essentially of a host crystal selected from the group consisting of $MgF_2$ and $ZnF_2$, a portion of the Mg or Zn ions of said host having been replaced by divalent metal ions selected from the group consisting of Co and Ni.

2. An optical maser material as claimed in claim 1 consisting essentially of a $MgF_2$ host crystal and divalent metal ions selected from the group consisting of Co and Ni in a concentration of from about 0.01 percent to 30 percent.

3. An optical maser material as claimed in claim 1 consisting essentially of a $ZnF_2$ host crystal and divalent metal ions selected from the group consisting of Co and Ni in a concentration of from about 0.01 percent to 30 percent.

4. An optical maser comprising an active medium consisting essentially of a monocrystalline host including paramagnetic ions characterized by a pair of optically connected energy levels, means for pumping said medium to populate the upper of said pair of energy levels, means for stimulating coherent emission from said medium at an optical wavelength longer than that corresponding to the energy separation of said pair of levels, said means being effective to induce the transition of electrons from the upper level to the lower level of said pair with simultaneous transfer of a phonon to the host crystal lattice, the energy of the phonon corresponding to the difference between the energy separation of said pair of levels and the energy of said stimulated emission, said medium consisting of a host selected from the group consisting of $MgF_2$ and $ZnF_2$, a portion of the Mg or Zn ions having been replaced by divalent metal ions selected from the group consisting of Co and Ni, means forming an optical cavity resonator including said active medium, and means for abstracting said coherent emission from said resonator.

References Cited

UNITED STATES PATENTS

| Re. 25,632 | 10/1962 | Boyle et al. | 331—94.5 |
| 3,203,899 | 8/1965 | Fisher | 252—301.6 X |

JEWELL H. PEDERSEN, *Primary Examiner.*

P. R. MILLER, *Assistant Examiner.*